(12) United States Patent
Lin et al.

(10) Patent No.: US 6,862,257 B2
(45) Date of Patent: Mar. 1, 2005

(54) METHOD FOR ADJUSTING A TILT ANGLE FOR AN OPTICAL DISC PLAYER

(75) Inventors: Chun-Nan Lin, Shijr (TW);
Tung-Lung Lin, Banchiau (TW);
Hsing-Hua Liu, Pingjen (TW)

(73) Assignee: Benq Corporation, Taoyuan (TW)

( * ) Notice: Subject to any disclaimer, the term of this patent is extended or adjusted under 35 U.S.C. 154(b) by 195 days.

(21) Appl. No.: 10/383,483

(22) Filed: Mar. 7, 2003

(65) Prior Publication Data
US 2003/0174618 A1 Sep. 18, 2003

(30) Foreign Application Priority Data
Mar. 12, 2002 (TW) ....................................... 91104627 A

(51) Int. Cl.[7] ................................................ G11B 7/00
(52) U.S. Cl. .................. 369/53.28; 369/53.19
(58) Field of Search .......................... 369/44.32, 53.19; 250/201.5, 559.3

(56) References Cited

U.S. PATENT DOCUMENTS 5,742,383 A * 4/1998 Jeon .......................... 356/138
5,896,362 A * 4/1999 Okuda et al. ............ 369/53.19
5,982,735 A * 11/1999 Tsai ........................... 720/675
6,677,565 B1 * 1/2004 Wahl et al. ............... 250/201.3

FOREIGN PATENT DOCUMENTS

TW 336311 7/1998
TW 457477 10/2001

* cited by examiner

Primary Examiner—Hoa T. Nguyen
Assistant Examiner—Brian F. Drula
(74) Attorney, Agent, or Firm—Snell & Wilmer L.L.P.

(57) ABSTRACT

The present invention discloses a method for adjusting a tilt angle of an optical disc driver. The method includes the following steps. First, to move the optical pick up to close the outer end of the first and second guiding shafts. Next, the turntable drives a disc to rotate. Then, the light source provides a light to penetrate through the disc and the lens. The image sensor receives the reflection light from the disc and the lens. The monitor displays the traces projected from the reflection lights. According to the traces, the driving device adjusts the positions of the first and second guiding shafts.

9 Claims, 5 Drawing Sheets

METHOD FOR ADJUSTING A TILT ANGLE FOR AN OPTICAL DISC PLAYER

This application claims priority of Taiwan Patent Application No. 091104627 filed on Mar. 12, 2002.

FIELD OF INVENTION

The present invention relates to a method for adjusting a tilt angle, and more particularly, to a method for adjusting a tilt angle of an optical pick-up in an optical disc driver.

BACKGROUND OF THE INVENTION

An optical pick-up is used to read or/and record information in a disc, such as a digital video disc (DVD) or a compact disc (CD) in an optical disc driver. As shown in FIG. 1A, the optical disc driver generally includes a turntable 18 for supporting and turning a disc 20, an optical pick-up 14 and the guiding shafts 11 and 12. Besides, there is a motor (not shown) for driving the optical pick-up 14 to move along the guiding shafts 11, 12. In other words, the motor drives the optical pick-up 14 to move along the radius direction of the disc 20 such that the optical pick-up 14 can read the entire information in the disc 20. The guiding shafts 11 and 12 respectively have two different ends and at least one end of each guiding shaft is connected to the optical disc driver by a screw, such as 151, 152, and 153 shown in FIG. 1B.

Conventionally, the information is stored in units that are either 0 or 1 so that there are different pits on the disc 20. The information is read by measuring the intensity of a laser beam reflected on the pits of a reflective layer on the disc 20 and by subsequent decoding.

When the optical disc driver reads or records information on the disc 20, the laser beam projecting from the optical pick-up 14 impinges perpendicularly on the disc 20, as shown in FIG. 2. Accordingly, the optical pick-up 14 receives the laser beam reflected from the pits. However, there is an undesired angle between the direction of the laser beam and the normal direction of the disc 20 as inaccurate assembly of component the optical disc driver occurs. The angle is defined as the tilt angle 28. The tilt angle 28 causes the inability of the optical pick-up 14 to receive the laser beam reflected from the disc 20 thereby leading to the reading error, or transmission breaking off, etc. When the data density on the disc 20 increases, this problem becomes more severe.

SUMMARY OF THE INVENTION

It is an aspect of the present invention to adjust a tilt angle of an optical pick-up such that the optical pick-up reads or records information correctly.

The present invention discloses a method of adjusting a tilt angle of an optical pick-up in an optical disc driver. First, the optical pick-up is moved to close the first outer end and the second outer end. Next, the method includes the following steps. The light source provides a parallel light to penetrate through the lens. One puts a disc on the turntable, and the turntable drives the disc to turn around.

Then, the image sensor receives the first reflection light reflected from the disc and the second reflection light reflected from the lens. The monitor displays a first trace projected by the first reflection light and a second trace projected by the second reflection light. Then, the computer controls the driving device to adjust the level of the first outer end and the second outer end, until the center of the first trace substantially coincides with the center of the second trace.

In the next step, a reference coordinate system is defined in the space. The coordinates of the first inner end, the first outer end, the second inner end and the second outer end are determined. Next step is to calculate an equation of a plane configured by the first inner end, the first outer end and the second outer end. Afterwards, an adjustment value of the second inner end is obtained and the second inner end is adjusted based on the adjustment value.

This and other aspects of the present invention will become clear to those of ordinary skill in the art after having read the following detailed description of the preferred embodiment which is illustrated in the various figures and drawings.

DETAILED DESCRIPTION

Figure 1A:
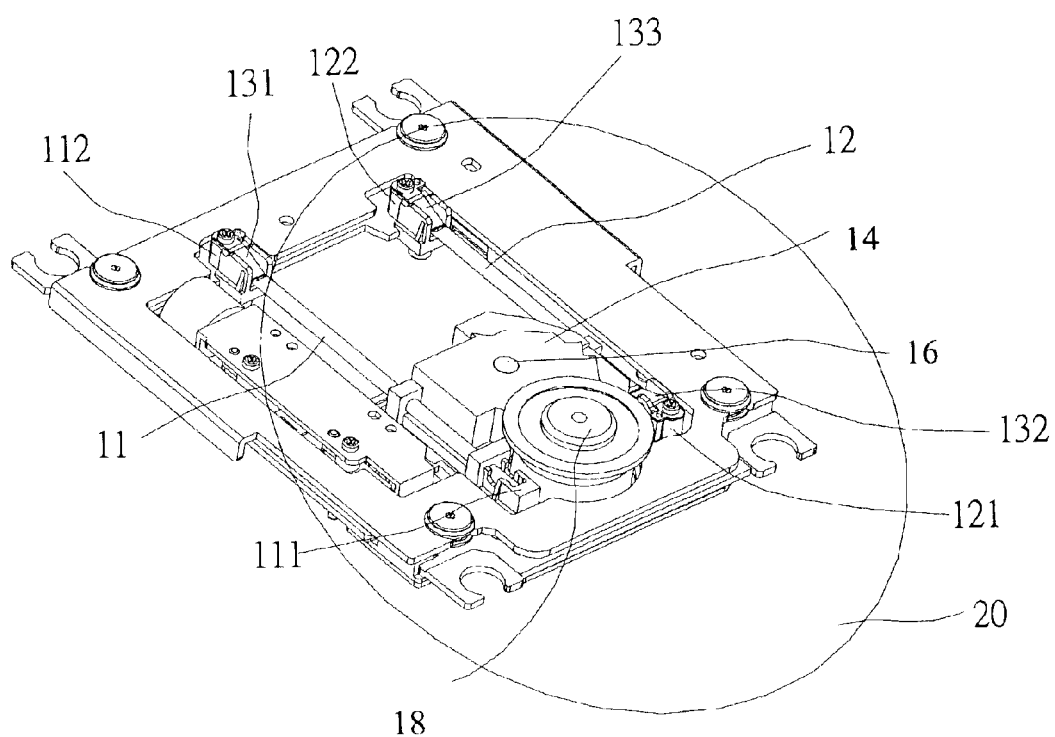
FIG. 1A is a schematic diagram showing a front side of an exemplary optical disc driver.
Figure 1B:
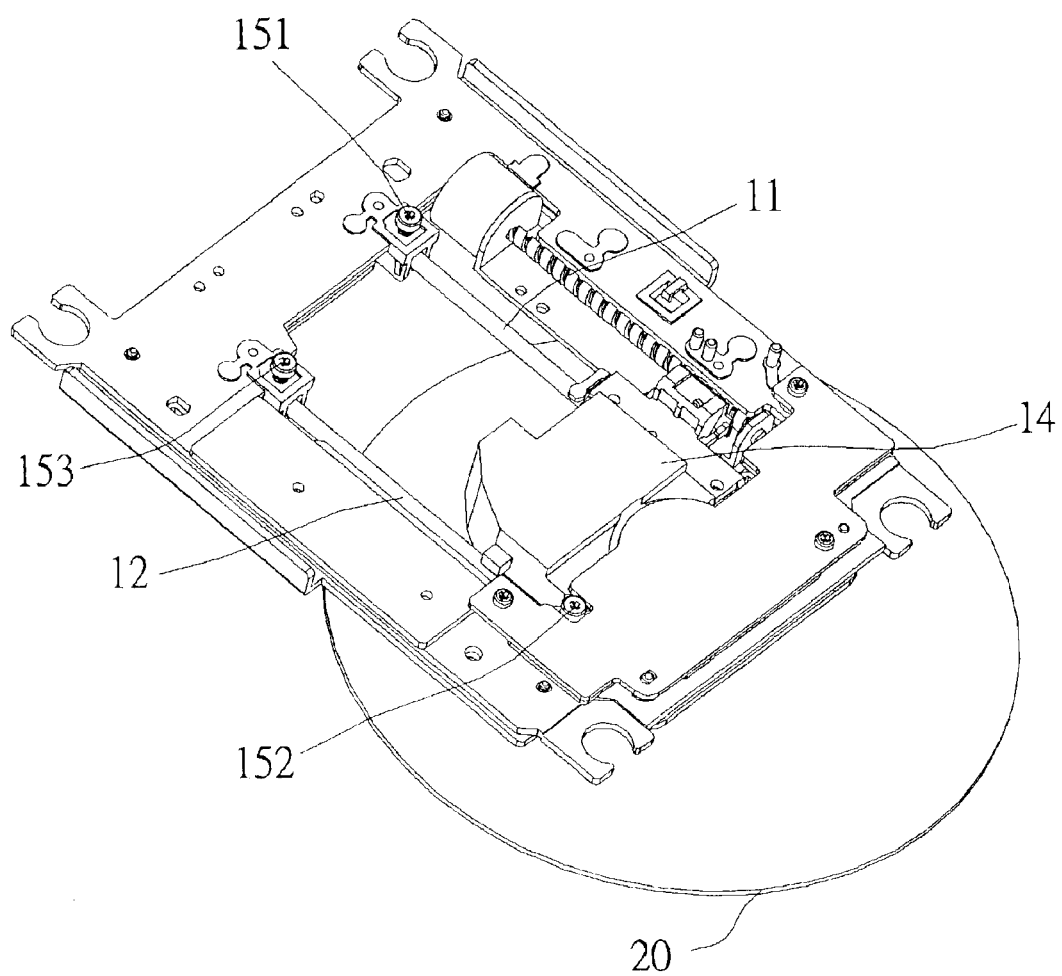
FIG. 1B is a schematic diagram showing a back side of an exemplary optical disc driver.

FIGS. 1A and 1B show an optical disc driver. The optical disc driver includes an optical pick-up 14 and a lens 16 disposed in the optical pick-up 14. Besides, the optical pick-up 14 further includes a first guiding shaft 11, a second guiding shaft 12 and a turntable 18. The first and second guiding shafts 11 and 12 provide to support and guide the optical pick-up 14 to move along the first and second guiding shaft 11 and 12. The turntable 18 provides to support the disc 20 and causes the disc 20 to rotate.

Figure 2:
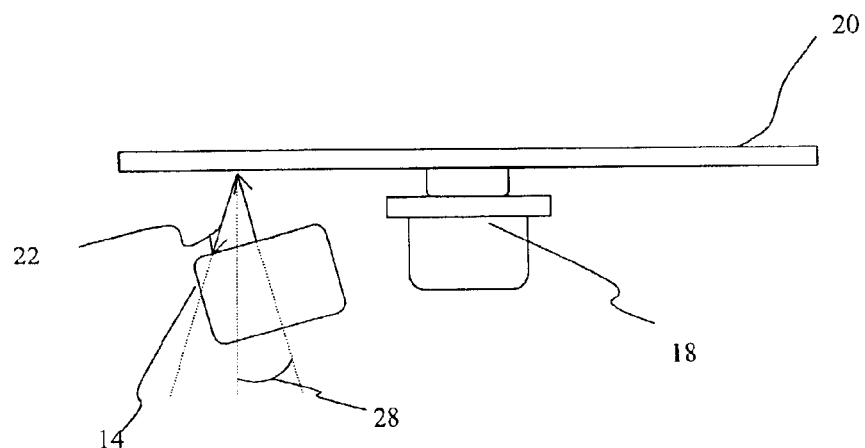
FIG. 2 is a schematic diagram of the operation of an exemplary optical pick-up.

As shown in FIG. 2, when the optical disc driver reads the information on the disc 20, the optical pick-up 14 impinges a laser beam onto the disc 20 and receives the laser beam reflected from the disc 20 to decode the signal. However, if there is a tilt angle between the direction of the laser beam and the normal direction of the disc 20, the laser beam reflected from the disc 20 can not penetrate through the lens 16 and impinge back to the optical pick-up 14 precisely. The tilt angle results in reading error. Therefore, the tilt angle should be reduced to a minimum in the manufacturing process of an optical disc driver.

Because the position of the turntable 18 is stationary relative to the mechanism of the optical disc driver, one way of reducing the tilt angle is to change the position of the optical pick-up 14, for example, the level of the first and second guiding shafts 11 and 12. Referring to the FIG. 1, the first guiding shaft 11 has a first inner end 111 adjacent to the turntable 20 and a first outer end 112 distant away from the turntable 20. The second guiding shaft 12 also has a second inner end 121 adjacent to the turntable 20 and a second outer end 122 distant away from the turntable 20. The level of the first guiding shaft 11 is controlled by the first inner end 111 and the first outer end 112. The level of the second guiding shaft 12 is controlled by the second inner end 121 and the second outer end 122.

In the exemplary embodiment as shown in the FIGS. 1A and 1B, the first inner end 111 is fixed in the optical disc driver. The positions of the other ends 112, 121 and 122 are respectively adjusted by screws 151, 152 and 153 and leaf springs 131, 132 and 133 which respectively correspond to the screws 151, 152 and 153.

Figure 3:
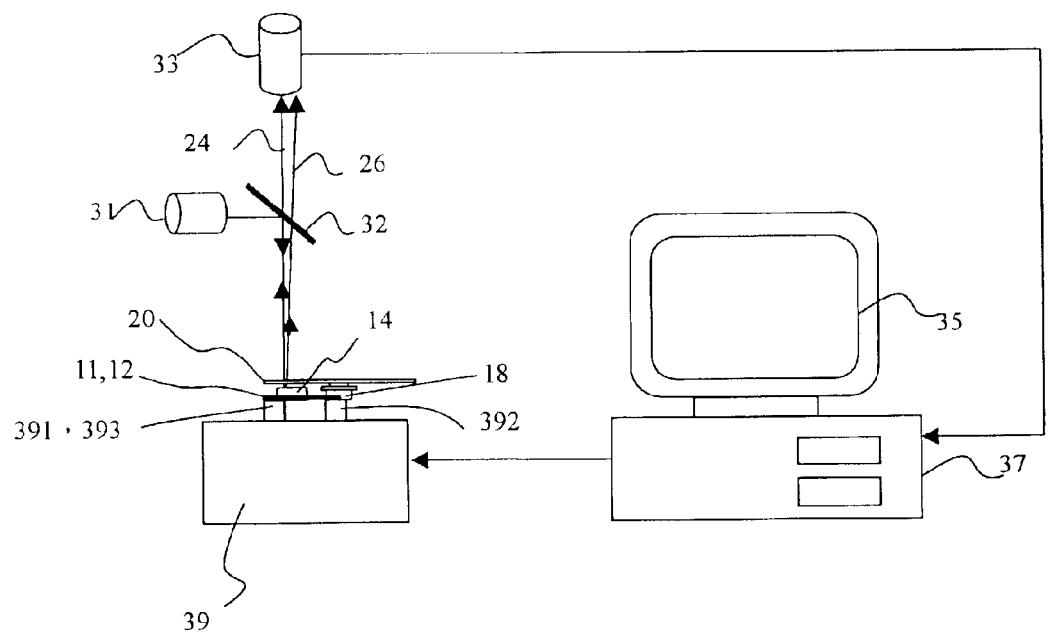
FIG. 3 is a schematic diagram of an exemplary adjustment system.
Figure 4:
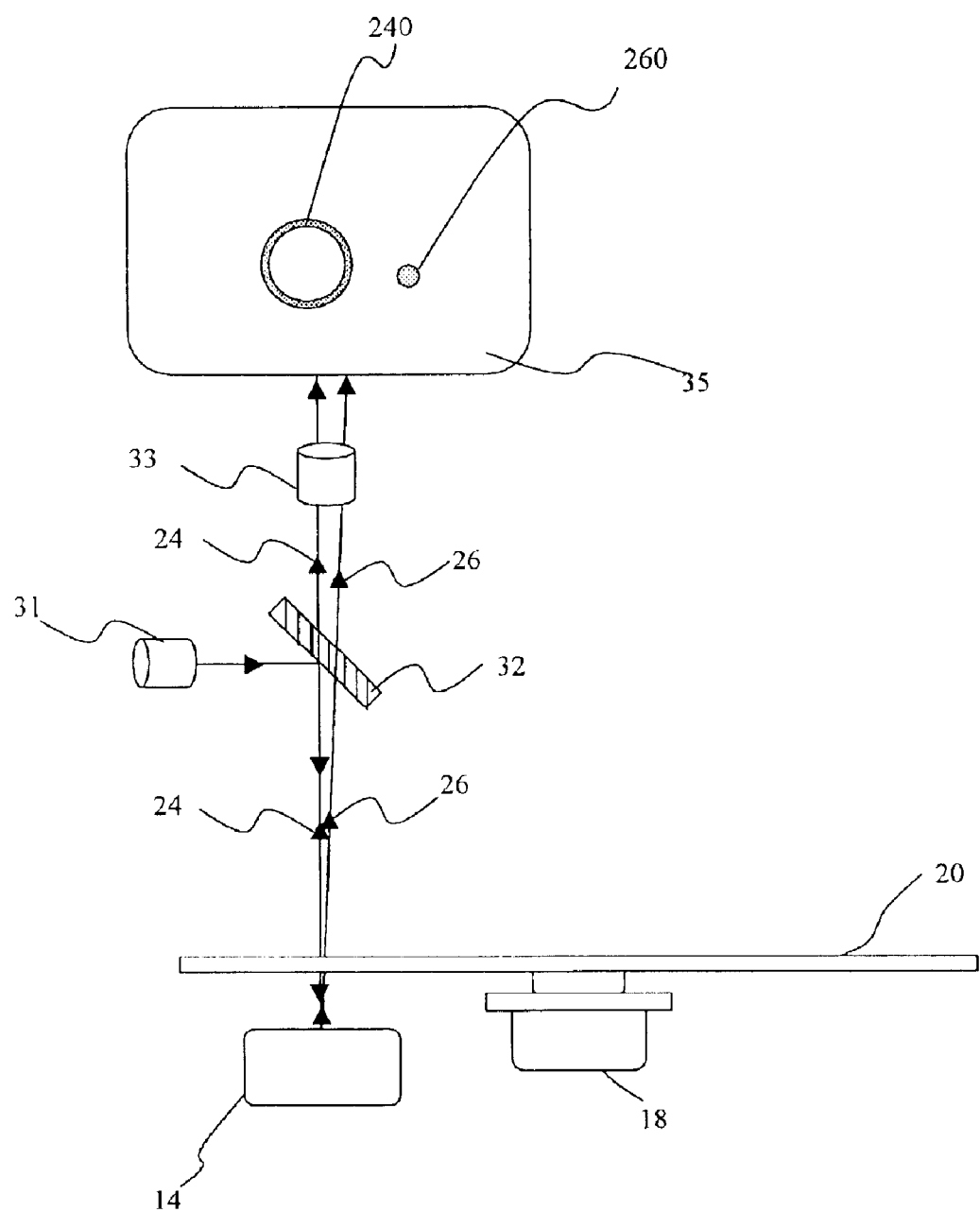
FIG. 4 is a schematic diagram of the reflection lights and the traces according to an exemplary embodiment.

Referring to the FIG. 3, the system of the present invention includes a light source 31, a beam splitter 32, an image sensor 33, a computer 37, a monitor 35, and a driving device 39. The driving device 39, such as a stepping motor, has a plurality of units 391, 392, and 393 corresponding to the screws 151, 152, and 153 respectively. The units 391, 392 and 393 respectively adjust the screws 151, 152 and 153 to change the levels of the first outer end 112, the second inner end 121, and the second outer end 122. The driving device 39 is controlled by a command sent from the computer 37.

In the present invention, the light source 31 includes an autocollimator. The image sensor 33 includes a charge coupled device (CCD). The disc 20 includes a transparent disc. Besides, before performing the method of the present invention, the direction of the light irradiating from the light source 31 is substantially perpendicular to the disc 20.

Figure 5:
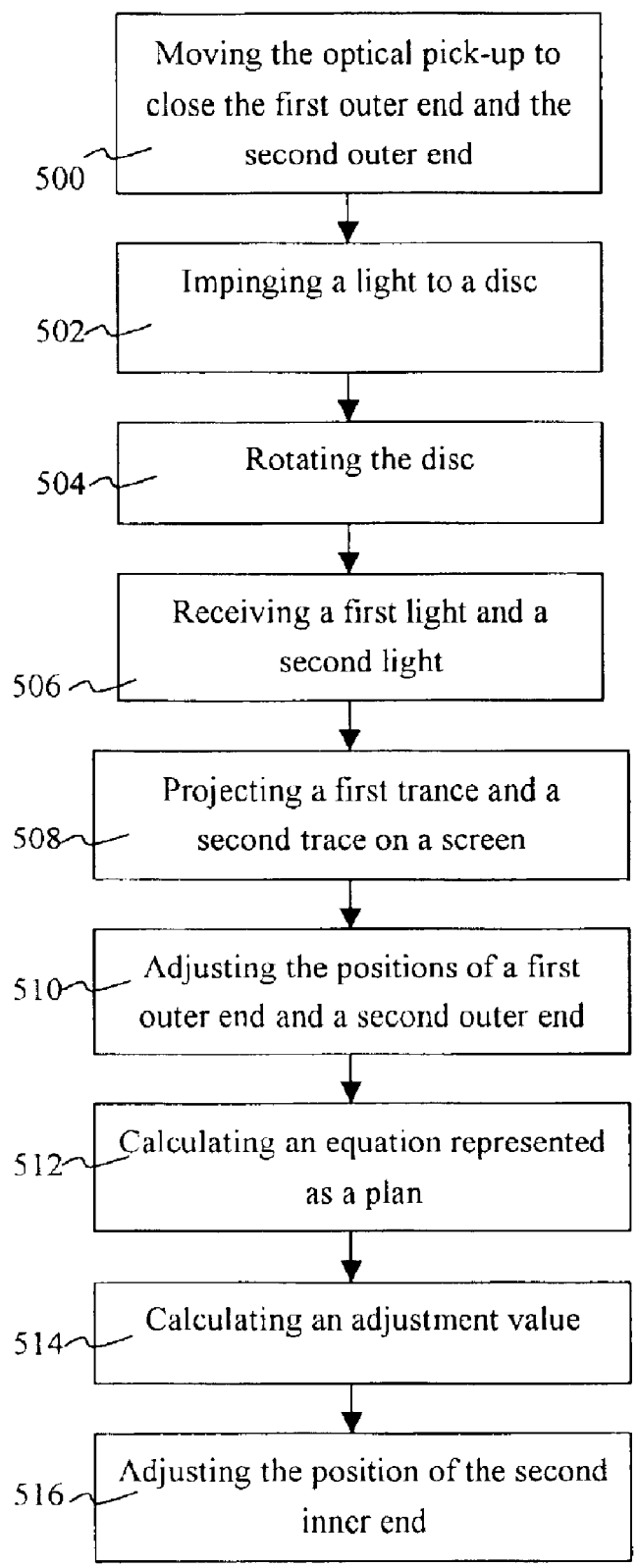
FIG. 5 is a flowchart of the adjustment method according to an exemplary embodiment.

Referring to the FIG. 5, the method of the present invention includes the steps as followed. In step 500, one moves the optical pick-up 14 to close the outer end of the guiding shafts 11 and 12, i.e., the first outer end 112 and the second outer end 122.

In step 502, the light source 31 provides a parallel light to impinge on the beam splitter 32, and then the light penetrates through the lens 16. In step 504, one puts a disc 20 on the optical disc driver, and the disc 20 rotates with the turntable 18 or a motor. Next, a light irradiating from the light source 31 impinges on the disc 20 and then penetrates through the disc 20 to the lens 16. Accordingly, there is a first reflection light 24 reflected from the disc 20 and there is a second reflection light 26 reflected from the lens 16.

In step 506, the first reflection light 24 and the second reflection light 26 are received by the image sensor 33 and then the image sensor 33 transmits the image signals to the computer 37. In step 508, the monitor 35 displays the traces of the reflection lights 24 and 26. The first reflection light 24 is projected to form a first trace 240, and the second reflection light 26 is projected into a second trace 260. Due to the rotating disc 20, the first trace 240 is projected to a ring-shaped trace, but the second trace 260 is a dot. Accordingly, the first trace 240 defines a center of the first trace 240 and the second trace 260 also defines a center of the second trace 260.

In step 510, when one uses the computer 37 to control the driving device 39, the units 391 and 393 respectively screw the screws 151 and 153. In other words, one adjusts the first outer end 112 and the second outer end 122 to make the center of the first trace 240 to substantially coincide with the center of the second trace 260.

In addition, after the adjustment step 510, the first inner end 111, the first outer end 112 and the second outer end 122 define a plane (not shown). The first guiding shaft 11 should be parallel to the second guiding shaft 12 such that the optical pick-up 14 moves accurately. On the other hand, the second inner end 121 should be in the defined plane.

In step 512, one defines a reference coordinate system in the space, and finds out the coordinates of the first inner end 111, the first outer end 112, the second inner end 121 and the second outer end 122, respectively. It assumes that the coordinates of the four ends 111, 112, 121 and 122 are respectively $(X_1, Y_1, Z_1)$, $(X_2, Y_2, Z_2)$, $(X_3, Y_3, Z_3)$ and $(X_4, Y_4, Z_4)$. Then, one calculates an equation representing the plane configured by the first inner end 111, the first outer end 112 and the second outer end 122. The plane equation is expressed by:

$$ax+by+cz=d \quad (1)$$

where a, b, c and d are constants.

In step 514, the value $X_3$ and $Y_3$ of the second inner end 121 are taken into the equation (1), and it will get $z=Z_3'$. The coordinate $(X_3, Y_3, Z_3')$ is presented as the new coordinate of the second inner end 121. Then, one calculates an adjustment value obtained by $Z_3'-Z_3$. In step 516, the computer 37 controls the driving device 39 such that the unit 393 of the driving device 39 performs the adjustment step. In other words, the unit 393 adjusts the screw 153 based on the adjustment value obtained. Therefore, the coordinate of the second inner end 121 is $(X_3, Y_3, Z_3')$, and the first guiding shaft 11 and the second guiding shaft 12 are parallel to each other and coplanar.

Those skilled in the art will readily observe that numerous modifications and alterations of the device may be made within the teaching of the invention. Accordingly, the above disclosure should be construed as limited only by the metes and bounds of the appended claims.

We claim:

1. A method for adjusting an optical pick-up of an optical disc driver, said optical pick-up including a lens, said optical disc driver including a turntable for supporting and driving a disc, and a first and a second guiding shaft for guiding said optical pick-up, said first guiding shaft including a first inner end adjacent to said turntable and a first outer end distant away from said turntable, said second guiding shaft including a second inner end adjacent to said turntable and a second outer end distant away from said turntable, said method comprising the steps of:

(1.1) moving said optical pick-up to close said first outer end and said second outer end;

(1.2) providing a light impinging on said disc such that a first reflection light is reflected from said disc, said light penetrating through said disc and impinging on said lens such that a second reflection light is reflected from said lens;

(1.3) driving said disc by using said turntable such that said first reflected light is projected into a first trace and said second reflected light is projected into a second trace, said first trace defining a center and said second trace defining a center;

(1.4) adjusting said first outer end and said second outer end to make said center of said first trace to substantially coincide with said center of said second trace, wherein, after said adjustment step, said first inner end, said first outer end and said second outer end defining a plane; and (1.5) adjusting said second inner end such that said second inner end is substantially on said plane.

2. The method of claim 1, step (1.4) further comprising: calculating an equation corresponding to said plane.

3. The method of claim 2, step (1.4) further comprising: calculating an adjustment value based on said equation.

4. The method of claim 3, wherein step (1.5) is performed based on said adjustment value.

5. The method of claim 1, wherein said first trace is in form of a ring.

6. The method of claim 1, wherein said second trace is in form of a dot.

7. A method for adjusting an optical pick-up of an optical disc driver, said optical pick-up including a lens, said optical disc driver including a turntable for supporting and driving a disc, and a first and a second guiding shaft for guiding said optical pick-up, said first guiding shaft including a first inner end adjacent to said turntable and a first outer end distant away from said turntable, said second guiding shaft including a second inner end adjacent to said turntable and a second outer end distant away from said turntable, said method comprising the steps of:

(7.1) moving said optical pick-up to close said first outer end and said second outer end;

(7.2) providing a light impinging on said disc such that a first reflection light is reflected from said disc, said light penetrating through said disc and impinging on said lens such that a second reflection light is reflected from said lens;

(7.3) driving said disc by using said turntable such that said first reflected light is projected into a first trace and said second reflected light is projected into a second trace, said first trace defining a center and said second trace defining a center;

(7.4) adjusting said first outer end and said second outer end to make said center of said first trace to substantially coincide with said center of said second trace, wherein, after said adjustment step, said first inner end, said first outer end and said second outer end defining a plane;

(7.5) adjusting said second inner end such that said second inner end is substantially on said plane;

(7.6) calculating an equation corresponding to said plane;

(7.7) calculating an adjustment value based on said equation; and (7.8) adjusting said second inner end based on said adjustment value such that said second inner end is substantially on said plane.

8. The method of claim 7, wherein said first trace is in form of a ring.

9. The method of claim 7, wherein said second trace is in form of a dot.

\* \* \* \* \*